Aug. 17, 1948.  F. E. WILLIAMS  2,447,448
MAGNESIUM GERMANATE PHOSPHORS
Filed Oct. 17, 1945
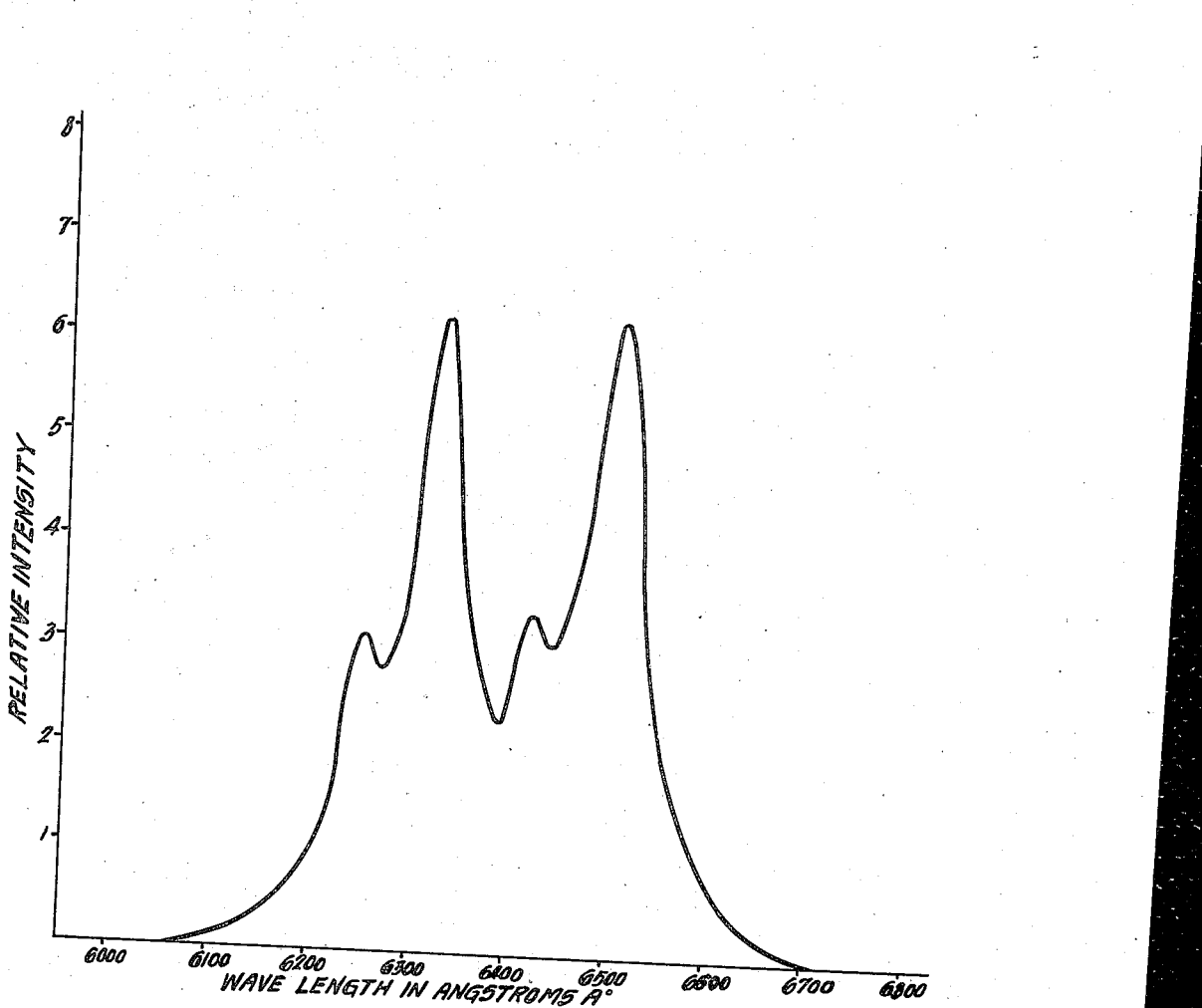
INVENTOR.
Ferd E. Williams
BY
Charles McClair
ATTORNEY Patented Aug. 17, 1948

2,447,448

UNITED STATES PATENT OFFICE 2,447,448

MAGNESIUM GERMANATE PHOSPHORS

Ferd E. Williams, Princeton, N. J., assignor to Radio Corporation of America, a corporation of Delaware Application October 17, 1945, Serial No. 622,824

2 Claims. (Cl. 252—301.4)

In apparatus requiring visual inspection in the dark, such as airplane instrument dials, for example, it has been the practice to use a phosphor material in the dials which emits green light upon excitation by ultra-violet light, radium or other exciting agent, because a dark-adapted eye more efficiently responds thereto. However, after viewing the dials in green light, the eye becomes markedly less efficient under blue light stimulation, which is the chief light received from the upper regions of the earth at night. Therefore, airplane instrument dials and other parts emitting green light reduce the ability of operators to discern airplanes and other objects in the dark.

It is known that red light does not materially reduce the efficiency of the dark-adapted eye for observing things in blue light prevailing at night. It is therefore an object of my invention to provide a phosphor material emitting light which does not reduce ability of the dark-adapted eye to observe objects in blue light.

Another object is to provide a phosphor which emits red light upon excitation by ultra-violet light (3650 Å.), as well as by radium and other agents.

Another object is to provide a phosphor of magnesium germanate having magnesium oxide over and above ortho proportions.

Other objects will appear in the following specification, reference being had to the drawing, in which:

The single figure of the drawing is a graph giving a measure of the intensity of luminescence in the wave length spectrum.

It is known that germanates, such as magnesium orthogermanate activated by manganese, luminesce as is described in the patent to H. W. Leverenz No. 2,066,044 and also that germanate compounds containing germanium in excess of ortho proportions have advantageous properties as a phosphor material, as disclosed in the patent of said Leverenz No. 2,274,272. The teaching of the prior art is in the direction of increased germanium oxide over that in the orthogermanate. I have found that variation of the content in the opposite direction produces remarkable results. More specifically, I have found that increasing the magnesium oxide above that in the magnesium orthogermanate results in a large unexpected improvement in the luminous efficiency of germanate phosphor. For example, under ultraviolet (3650 Å.) excitation one of my new germanate phosphors having the gram-molecular formula of $4MgO.GeO_2:0.01Mn$ has 600 per cent greater efficiency than the most efficient manganese-activated orthogermanate $$(2MgO.GeO_2:0.01Mn)$$

The increased efficiency also occurs under excitation by still shorter ultra-violet wave lengths (2537 Å.) and other undulatory excitation.

The composition $4MgO.GeO_2:0.01Mn$ has been found to result in maximum efficiency, but the maximum with respect to magnesium oxide content has been found to be quite broad, decreasing only at each side of the peak to 75% of maximum efficiency with $3MgO.GeO_2:yMn$ and $$5MgO.GeO_2:yMn,$$

coefficient $y$ indicating variable manganese content. Even as great a magnesium oxide content as that corresponding to the composition $$10MgO.GeO_2:yMn$$

results in a phosphor with about the same efficiency as the orthogermanate $2MgO.GeO_2:yMn$, while contents as high as that corresponding to $20MgO.GeO_2:yMn$ still give quite useful results.

As an example of the method of preparing my new phosphor, I intimately mix 4 mols (161.28 grams) of pure magnesium oxide or 4 mols (593.34 grams) of pure magnesium nitrate (at least C. P. quality) with 1 mol (104.60 grams) of pure germanium dioxide (preferably redistilled as the chloride followed by hydrolysis to the oxide), using 0.01 mol (1.7895 grams) of pure manganese nitrate as activator. After adding sufficient distilled water to the mixture to make a paste, the product is stirred thoroughly and evaporated to dryness in a platinum crucible. The dried product is ground to a fine powder in a quartz or porcelain mortar, and crystallized in a platinum crucible by heating for about one hour at a temperature between 800° C. and 1400° C. A temperature of about 1100° C. has been found to give the most efficient product. If the resulting phosphor is not completely satisfactory, it may be thoroughly reground again and heated for an additional half hour at the same temperature. The total heating time is not very critical. Heating for periods as short as 10 minutes results in a product of reasonable efficiency and heating for periods as great as 10 hours produces a satisfactory product. The manganese concentration may be varied from 0.001 mole to 0.1 mole per mole of germanium dioxide, but substantially 0.01 mole has been found to be optimum. Also, as previously discussed, the magnesium oxide may be varied from ortho proportions to as much as 20 moles of MgO per mole of GeO₂.

The curve in the drawing shows the relative luminescence of the material at various wave lengths. The abscissas of the curve are wave lengths in angstroms (Å.) and the ordinates represent relative luminescence. In obtaining these values a photograph of the luminescence at various wave lengths was taken and the density was measured in relation to the density of the background.

A phosphor made in accordance with my invention, upon excitation by ultra-violet light, produces an efficient red light which permits easy inspection of the instrument dials or other parts of an airplane by the dark-adapted eye of the pilot or other operator for control of the airplane, without decreasing the efficiency of the eye to discern other airplanes or objects illuminated by blue light.

As a precaution against failure of the ultra-violet generator, radium or equivalent may be incorporated in the phosphor or in a layer adjacent thereto to excite the phosphor material to luminescence.

Use of my improved phosphor is not limited to the airplane use described, as that was given by way of example. The remarkable increase in efficiency of luminescence makes the phosphor useful for luminescent screens for cathode ray tubes, luminescent coatings for fluorescent lamps and X-ray fluoroscopes, as well as for luminescent preparations and products such as paints, tapes, plastics, enamels, etc.

The constituents of my improved phosphor may vary rather widely in proportions. In the formula $x$MgO.GeO₂:$y$MnO, $x$ may have lower and upper limits of 2 and 20, respectively, and $y$ may vary between 0.0001 and 0.1.

Zinc oxide may be substituted in part or wholly for the magnesium oxide. This results, however, in shifting the emission spectra from the red to the orange and finally to the yellow with increasing replacement of the magnesium oxide by the zinc oxide.

The improved phosphor of my invention has the following desirable properties:

1. Reflects white light under illumination by white light.
2. Is stable under atmospheric conditions.
3. Emits red light.
4. Has a photoluminescence giving a brightness of 30 microlambert on excitation by an RP 12 lamp with filter operated at 1 ampere placed 10 inches from phosphor.

Having described my invention, what I claim is:

1. A phosphor for use in connection with a screen consisting of magnesium oxide and germanium oxide and manganese activator having the gram molecular formula, $x$MgO·GeO₂:$y$Mn in which $x$ is a number lying between and including 3 and 5 and $y$ is a number lying between and including 0.001 and 0.1.

2. A phosphor for use in connection with a screen consisting of magnesium oxide and germanium oxide and manganese activator having the gram molecular formula, 4MgO·GeO₂:$y$Mn in which $y$ is a number lying between and including 0.001 and 0.1.

FERD E. WILLIAMS.

REFERENCES CITED

The following references are of record in the file of this patent:

UNITED STATES PATENTS

| Number | Name | Date |
|---|---|---|
| 2,066,044 | Leverenz | Dec. 29, 1936 |
| 2,171,145 | Leverenz | Aug. 29, 1939 |
| 2,274,272 | Leverenz | Feb. 24, 1942 |
| 2,314,699 | Hale | Mar. 23, 1943 |